(12) United States Patent
Misra et al.

(10) Patent No.: US 11,847,417 B2
(45) Date of Patent: Dec. 19, 2023

(54) DATA-DRIVEN SOCIAL MEDIA ANALYTICS APPLICATION SYNTHESIS

(71) Applicant: ACCENTURE GLOBAL SOLUTIONS LIMITED, Dublin (IE)

(72) Inventors: Janardan Misra, Bangalore (IN); Vikrant Kaulgud, Pune (IN); Sanjay Podder, Thane (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 295 days.

(21) Appl. No.: 17/200,469

(22) Filed: Mar. 12, 2021

(65) Prior Publication Data

US 2022/0292264 A1  Sep. 15, 2022

(51) Int. Cl.
*G06F 40/30* (2020.01)
*G06F 40/289* (2020.01)
*G06N 20/20* (2019.01)
*G06F 16/28* (2019.01)

(52) U.S. Cl.
CPC ............ *G06F 40/30* (2020.01); *G06F 16/285* (2019.01); *G06F 40/289* (2020.01); *G06N 20/20* (2019.01)

(58) Field of Classification Search
CPC ...... G06F 40/30; G06F 16/285; G06F 40/289; G06F 16/9536; G06N 20/20
See application file for complete search history.

(56) References Cited

U.S. PATENT DOCUMENTS

| | | | |
|---|---|---|---|
| 2015/0248476 A1* | 9/2015 | Weissinger | G06F 16/35 707/737 |
| 2018/0012230 A1* | 1/2018 | Feigenblat | G06Q 50/01 |
| 2020/0042316 A1* | 2/2020 | Roy | G06F 16/3338 |
| 2020/0126174 A1* | 4/2020 | Halse | G06Q 50/265 |
| 2021/0011736 A1* | 1/2021 | Kim | G06F 9/455 |
| 2021/0065048 A1* | 3/2021 | Salonidis | G06F 9/542 |
| 2021/0083855 A1* | 3/2021 | Polleri | H04L 9/088 |
| 2021/0294969 A1* | 9/2021 | Viswanathan | G06F 40/253 |
| 2022/0051116 A1* | 2/2022 | Yu | G06N 20/20 |
| 2022/0383639 A1* | 12/2022 | Javan Roshtkhari | G06V 40/23 |

* cited by examiner

*Primary Examiner* — Paras D Shah
*Assistant Examiner* — Athar N Pasha
(74) *Attorney, Agent, or Firm* — Mannava & Kang, P.C.

(57) ABSTRACT

In some examples, data-driven social media analytics application synthesis may include generating, for each social media analytics application of a plurality of social media analytics applications, a corpus, performing term normalization, and generating a normalized corpus. An actor, an action and an object may be generated for each social media analytics application, which may be mapped into an embedding space. A semantic cohesion network may be generated for each social media analytics application, and a pair-wise semantic cohesion may be determined to identify semantically cohesive groups. A new social media analytics application may be synthesized based on the identified semantically cohesive groups.

20 Claims, 9 Drawing Sheets

| Application | Features and PAS | ML Ensemble | Performance Metric | ML Pipeline |
|---|---|---|---|---|
| $smaApp_1$ | $(F_{1,1}, \delta_{1,1})$ ... $(F_{1,n_1}, \delta_{1,n_1})$ | $\{ML_{1,1}, ML_{1,2}, ...\}$ | $\{p_{1,1}, p_{1,2}, ...\}$ | $Pipeline_{ML}[smaApp_1]$ |
| $smaApp_2$ | $(F_{2,1}, \delta_{2,1})$ ... $(F_{2,n_2}, \delta_{2,n_2})$ | $\{ML_{2,1}, ML_{2,2}, ...\}$ | $\{p_{2,1}, p_{2,2}, ...\}$ | $Pipeline_{ML}[smaApp_2]$ |
| ... | ... ... | ... | ... | ... |
| $smaApp_R$ | $(F_{R,1}, \delta_{R,1})$ ... $(F_{R,n_R}, \delta_{R,n_R})$ | $\{ML_{R,1}, ML_{R,2}, ...\}$ | $\{p_{R,1}, p_{R,2}, ...\}$ | $Pipeline_{ML}[smaApp_R]$ |

300 → Application
302 → Features and PAS
304 → ML Ensemble
306 → Performance Metric
308 → ML Pipeline

IDENTIFY, FOR EACH SOCIAL MEDIA ANALYTICS APPLICATION OF A PLURALITY OF SOCIAL MEDIA ANALYTICS APPLICATIONS, AND BASED ON A PAIR-WISE SEMANTIC COHESION, SEMANTICALLY COHESIVE GROUPS
702

SYNTHESIZE, BASED ON THE IDENTIFIED SEMANTICALLY COHESIVE GROUPS, A NEW SOCIAL MEDIA ANALYTICS APPLICATION
704

*FIG. 7*

DATA-DRIVEN SOCIAL MEDIA ANALYTICS APPLICATION SYNTHESIS

BACKGROUND

Social media may represent a source of user generated data, which may be harnessed to extract subtle insights that have the potential to bring significant market differentiation. Social media data may be used for various purposes such as user feedback driven product feature design, psychological intervention for mental disorders, etc.

BRIEF DESCRIPTION OF DRAWINGS

Features of the present disclosure are illustrated by way of example and not limited in the following figure(s), in which like numerals indicate like elements, in which:

FIG. 3 illustrates details related to a social media analytics applications database to illustrate operation of the data-driven social media analytics application synthesis apparatus of FIG. 1 in accordance with an example of the present disclosure;

FIG. 7 illustrates a flowchart of an example method for data-driven social media analytics application synthesis in accordance with an example of the present disclosure.

DETAILED DESCRIPTION

Figure 1:
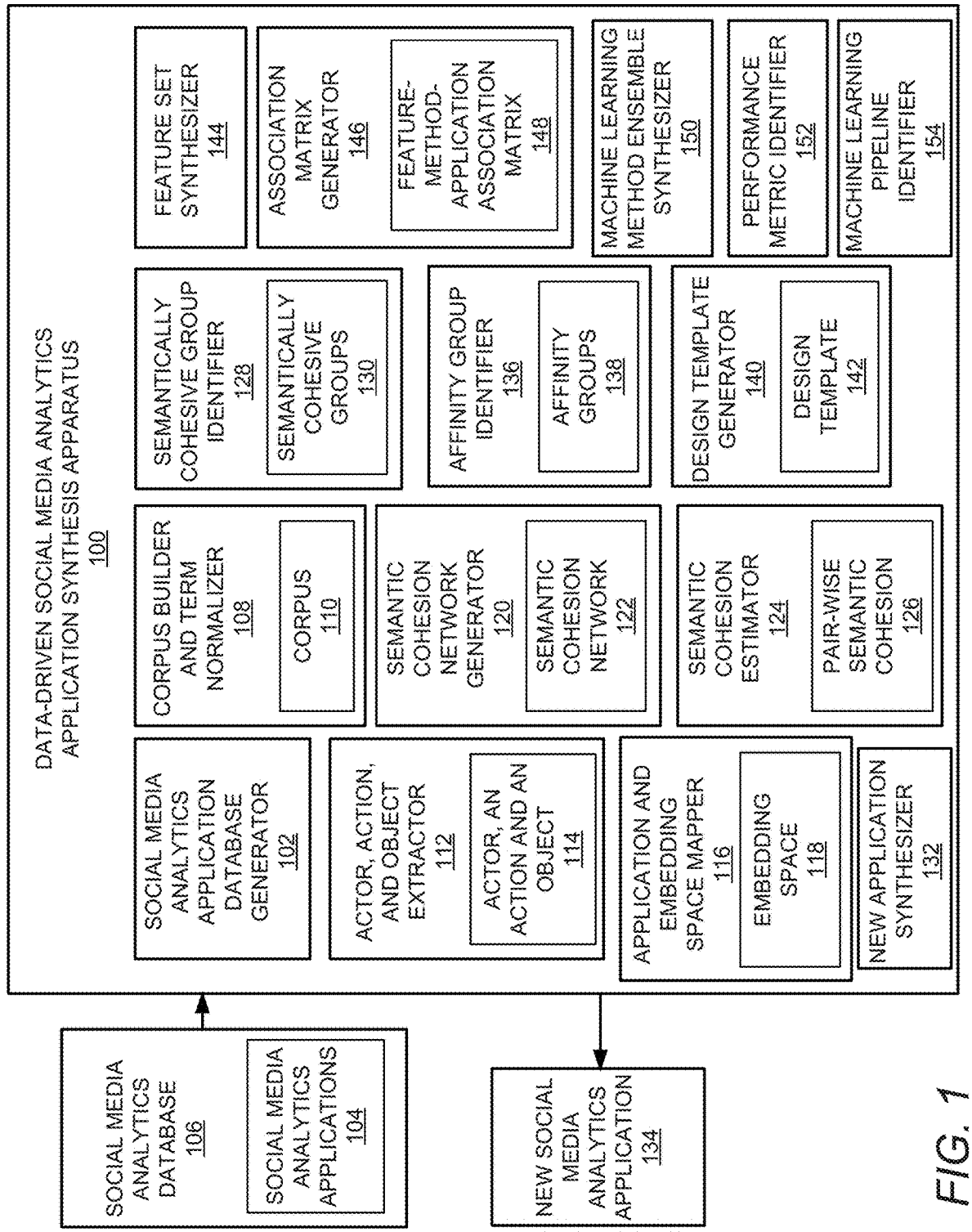
FIG. 1 illustrates a layout of a data-driven social media analytics application synthesis apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Data-driven social media analytics application synthesis apparatuses, methods for data-driven social media analytics application synthesis, and non-transitory computer readable media having stored thereon machine readable instructions to provide data-driven social media analytics application synthesis are disclosed herein. The apparatuses, methods, and non-transitory computer readable media disclosed herein provide for the design and generation of social media analytics applications. In this regard, the apparatuses, methods, and non-transitory computer readable media disclosed herein provide for synthesizing of a design template for new social media analytics applications by identifying a correct set of features, ensemble of machine learning methods, performance metrics, and a machine learning architecture pipeline.

With respect to the apparatuses, methods, and non-transitory computer readable media disclosed herein, social media may represent a major source of user generated data, which may be harnessed to extract subtle insights that have the potential to bring significant market differentiation. Social media data may be used for various purposes such as user feedback driven product feature design, psychological intervention for mental disorders, etc.

In this regard, it is technically challenging to design and develop machine learning (ML) based data-driven social media analytics (SMA) applications. For example, design and development of machine learning based data-driven social media analytics applications may require significant experience in multiple domains.

The apparatuses, methods, and non-transitory computer readable media disclosed herein may address at least the aforementioned technical challenges by implementing a feature identification process or selection of machine learning method ensembles. In this regard, automated support in the design and development phases may accelerate an overall new application development process, and reduce the delay between ideation to production through reuse of machine learning designs across semantically correlated applications.

According to examples disclosed herein, the apparatuses, methods, and non-transitory computer readable media disclosed herein provide technical benefits such as generation of a new application that is robust and less prone to failure. For example, the apparatuses, methods, and non-transitory computer readable media disclosed herein provide for implementation of a feature identification process or selection of machine learning method ensembles for development of a new application. In this regard, the apparatuses, methods, and non-transitory computer readable media disclosed herein provide for synthesizing of a design template for new social media analytics applications by identifying a correct set of features, ensemble of machine learning methods, performance metrics, and a machine learning architecture pipeline.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example data-driven social media analytics application synthesis apparatus (hereinafter also referred to as "apparatus 100").

Referring to FIG. 1, the apparatus 100 may include a social media analytics application database generator 102 that is executed by at least one hardware processor (e.g., the hardware processor 602 of FIG. 6, and/or the hardware processor 704 of FIG. 7) to generate, for a plurality of social media analytics applications 104, a social media analytics applications database 106.

According to examples disclosed herein, each social media analytics application of the plurality of social media analytics applications 104 may include a problem description, a social media platform, a feature set, an ensemble of machine learning methods, a performance metric, and an application identification.

A corpus builder and term normalizer 108 that is executed by at least one hardware processor (e.g., the hardware processor 602 of FIG. 6, and/or the hardware processor 704 of FIG. 7) may generate, for each social media analytics application of a plurality of social media analytics applications 104, a corpus 110. The corpus builder and term normalizer 108 may perform, for the corpus 110 for each social media analytics application of the plurality of social media analytics applications 104, term normalization. Further, the corpus builder and term normalizer 108 may generate, for the corpus 110 for each social media analytics application of the plurality of social media analytics applications 104, and based on the term normalization, a normalized corpus.

An actor, action, and object extractor 112 that is executed by at least one hardware processor (e.g., the hardware processor 602 of FIG. 6, and/or the hardware processor 704 of FIG. 7) may generate, for the normalized corpus for each social media analytics application of the plurality of social media analytics applications 104, an actor, an action and an object 114.

An application and embedding space mapper 116 that is executed by at least one hardware processor (e.g., the hardware processor 602 of FIG. 6, and/or the hardware processor 704 of FIG. 7) may map, based on the actor, the action and the object 114, each social media analytics application of the plurality of social media analytics applications 104 into an embedding space 118.

A semantic cohesion network generator 120 that is executed by at least one hardware processor (e.g., the hardware processor 602 of FIG. 6, and/or the hardware processor 704 of FIG. 7) may generate, for each social media analytics application of the plurality of social media analytics applications 104 mapped into the embedding space 118, a semantic cohesion network 122.

A semantic cohesion estimator 124 that is executed by at least one hardware processor (e.g., the hardware processor 602 of FIG. 6, and/or the hardware processor 704 of FIG. 7) may determine, for each social media analytics application of the plurality of social media analytics applications 104, and based on the semantic cohesion network 122, a pairwise semantic cohesion 126.

A semantically cohesive group identifier 128 that is executed by at least one hardware processor (e.g., the hardware processor 602 of FIG. 6, and/or the hardware processor 704 of FIG. 7) may identify, for each social media analytics application of the plurality of social media analytics applications 104, and based on the pair-wise semantic cohesion 126, semantically cohesive groups 130.

A new application synthesizer 132 that is executed by at least one hardware processor (e.g., the hardware processor 602 of FIG. 6, and/or the hardware processor 704 of FIG. 7) may synthesize, based on the identified semantically cohesive groups 130, a new social media analytics application 134.

An affinity group identifier 136 that is executed by at least one hardware processor (e.g., the hardware processor 602 of FIG. 6, and/or the hardware processor 704 of FIG. 7) may identify, for the new social media analytics application 134, a plurality of affinity groups 138 from the semantically cohesive groups 130.

A design template generator 140 that is executed by at least one hardware processor (e.g., the hardware processor 602 of FIG. 6, and/or the hardware processor 704 of FIG. 7) may generate, based on the plurality of affinity groups 138 identified from the semantically cohesive groups 130, a design template 142 for the new social media analytics application 134 to include components of feature set, ensemble of machine learning methods, performance metrics, and machine learning pipeline architecture.

A feature set synthesizer 144 that is executed by at least one hardware processor (e.g., the hardware processor 602 of FIG. 6, and/or the hardware processor 704 of FIG. 7) may synthesize, for the new social media analytics application 134, the feature set to include a specified number of features.

An association matrix generator 146 that is executed by at least one hardware processor (e.g., the hardware processor 602 of FIG. 6, and/or the hardware processor 704 of FIG. 7) may generate, for the new social media analytics application 134, a feature-method-application association matrix 148 that includes features from the feature set and machine learning methods.

A machine learning method ensemble synthesizer 150 that is executed by at least one hardware processor (e.g., the hardware processor 602 of FIG. 6, and/or the hardware processor 704 of FIG. 7) may identify, for the new social media analytics application 134 and based on the feature-method-application association matrix 148, the ensemble of machine learning methods.

A performance metric identifier 152 that is executed by at least one hardware processor (e.g., the hardware processor 602 of FIG. 6, and/or the hardware processor 704 of FIG. 7) may identify, for the new social media analytics application 134 and based on the feature-method-application association matrix 148, the performance metrics.

A machine learning pipeline identifier 154 that is executed by at least one hardware processor (e.g., the hardware processor 602 of FIG. 6, and/or the hardware processor 704 of FIG. 7) may determine, for the new social media analytics application 134 and based on the feature-method-application association matrix 148, the machine learning pipeline architecture.

According to examples disclosed herein, the new application synthesizer 132 may synthesize, based on the identified semantically cohesive groups, the feature set for the new social media analytics application 134, the ensemble of machine learning methods for the new social media analytics application 134, the performance metrics for the new social media analytics application 134, and the machine learning pipeline architecture for the new social media analytics application 134, the new social media analytics application 134.

Operation of the apparatus 100 is described in further detail with reference to FIGS. 1-5.

With respect to characterization of social media analytics applications, characterization may include components such as problem specification, social media platform, feature set, ensemble of machine learning methods, performance parameters, and machine learning architectural pipeline.

Problem specification may include, for example, a text based description specifying key objectives of the social media analytics application and problem. For example, a problem specification may indicate: SMA1: "Identify level of drug addiction of a user from his/her twitter feeds". According to another example, a problem specification may indicate: SMA2: "Find how popular a product is using user feedback data".

With respect to social media platform, an identifier for the social media platform, where users post their feeds, may include, for example, Twitter™, Reddit™ Facebook™, Amazon Product Feedback™, etc.

A feature set may include a set of features together with the performance association scores (PAS). Examples of feature sets may include lexicon features, syntactic features, dependency features, statistical features, image features, audio features (e.g., MCMC), time series, etc.

The ensemble of machine learning methods may include machine learning methods used for solving underlying learning challenges for building social media analytics application. Examples: Linear Classifier|Non-Linear Classifier With respect to performance parameters, set of parameters (single or multiple) used for measuring performance of the ML methods underlying the social media analytics application. Examples of the performance parameters may include, for example, accuracy, precision, recall, F-1, etc.

With respect to machine learning architectural pipeline, a sequence of steps to be executed on an AutoML platform may utilize a feature set as a specification to extract feature values from data, training machine learning methods, and estimating performance parameters.

With respect to social media analytics application, examples may include applications for product planning based upon customer feedback analysis, stock prediction using twitter sentiment analysis, mentor identification through Reddit™ analysis, social media analytics for crisis management, social media analytics for smart health, social media analytics for tourism planning and investment, social media analytics for ad selection, social media analytics for product marketing, social media analytics for mental health, etc.

Feature types may include text features, contextual features, and non-text features. Text-features may be extracted from text of the user feed in social-media, lexical, syntactic, semantic, and statistical. Contextual-features may be extracted from the meta information associated with the user feed in social-media, location, language, date-time, gender, and topic of user feed. Non-text features may be extracted from the non-text context of the user feed in social-media, image features, audio/voice features, video features, hyperlinks, and crosslinks.

Figure 2:
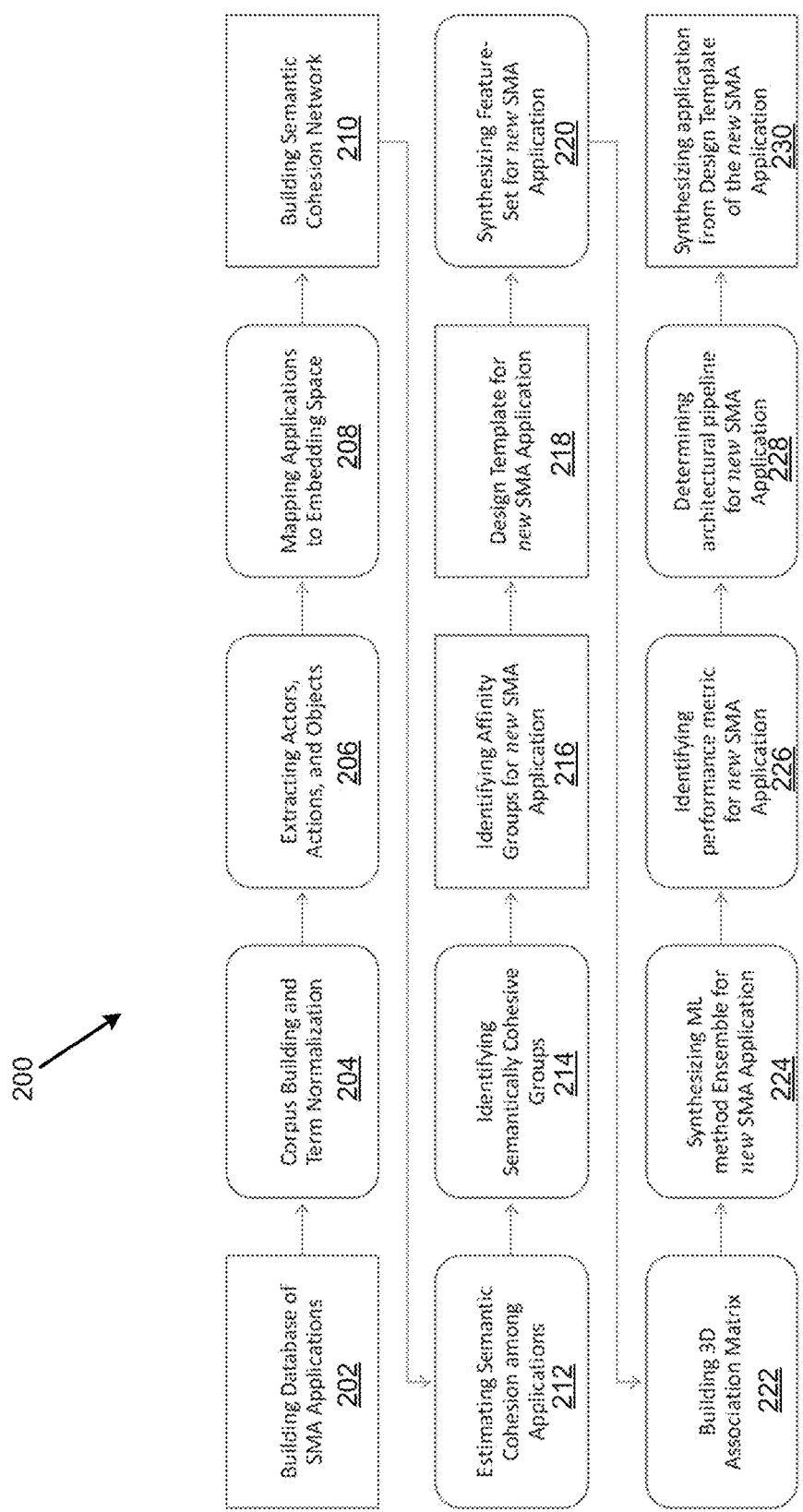
FIG. 2 illustrates a logical flow to illustrate operation of the data-driven social media analytics application synthesis apparatus of FIG. 1 in accordance with an example of the present disclosure.

FIG. 2 illustrates a logical flow 200 to illustrate operation of the apparatus 100 in accordance with an example of the present disclosure.

Referring to FIG. 2, at block 202, with respect to building a database of social media analytics applications, the social media analytics application database generator 102 may specify smaDB={smaApp_1, . . . , smaApp_M} to be the database of social media analytics applications at a time-point during execution of the apparatus 100 to synthesize a design template for a new social media analytics application 134 (referred hence forth as new$_{smaAPP}$). As disclosed herein, each application may include the fields of problem description, social media platform, feature set together with performance association scores (PAS), ensemble of machine learning methods, performance metric, and application identification (ID). The performance association score of a feature may determine (e.g., estimate) as to what extent the feature contributes to achieve an overall performance of the machine learning model that solves the underlying social media analytics application. The performance association score may be determined as a reduction in the overall accuracy score when a feature is excluded while building the machine learning model. For an example application, feature specifications may include (Glove, 0.67), which would indicate that glove vectors of the user feeds for the problem in the application collectively contribute 67% towards achieving the final performance of the machine learning model.

FIG. 3 illustrates details related to a social media analytics applications database 106 to illustrate operation of the apparatus 100 in accordance with an example of the present disclosure.

Referring to FIG. 3, the social media analytics applications database 106 may include a column of applications at 300, features and performance association scores (PAS) at 302, machine learning ensemble at 304, performance metrics at 306, and machine learning pipeline at 308. For FIG. 3, $F_{i,j}$ is the $j^{th}$ feature of $i^{th}$ application smaApp$_i$ with PAS as $\delta_{i,j}$.

With respect to measurement of semantic cohesion among social media analytics applications, at block 204 of FIG. 2, the corpus builder and term normalizer 108 may build a corpus and perform term normalization. In this regard, for each social media analytics application in smaDB, the corpus builder and term normalizer 108 may extract details appearing in the description and preprocess text. The corpus builder and term normalizer 108 may collect the preprocessed text-data into a corpus. Further, the corpus builder and term normalizer 108 may perform term disambiguation by replacing equivalent terms with one representative term in the corpus including linguistic variants (e.g., 'countries' and 'country'), abbreviations (e.g., 'IP' and 'Intellectual Property'), domain equivalents (e.g., 'smartcard' and 'Scard'), and lexicon equivalents (e.g., 'goal' and 'objective').

With respect to extracting actors, actions, and objects, at block 206 of FIG. 2, the actor, action, and object extractor 112 may perform concept extraction by identifying terms referring to entities (e.g., actors performing actions related to the social media analytics applications and objects, states of which these actions change, or which participate in during execution of the actions) as 'noun-phrases', and terms referring to functionalities of the social media analytics applications (e.g., actions which social media analytics application enables) as 'verb-phrases' by applying, for example, POS-Tagger and Chunker. For example, in sentence "XBC application connects drug addicts to potential mentors based upon their posts", the identifiable entity terms may include "XBC application", 'drug addict' and 'mentor' and 'post', and the identifiable functionality may include 'connect'.

With respect to mapping terms to embedding space, at block 208 of FIG. 2, the application and embedding space mapper 116 may generate term embeddings. In this regard, the application and embedding space mapper 116 may select pre-trained word embeddings (e.g., word2vec or Glove model). Further, the application and embedding space mapper 116 may determine (e.g., estimate) information theoretic significance for each word in terms (e.g., extracted at block 206) with respect to the corpus using a bag-of-words retrieval function such as BM25. In this regard, the application and embedding space mapper 116 may specify bm25 (w) to be the information theoretic significance for word w, and e(w) to be the word embedding from the pre-trained model. The application and embedding space mapper 116 may transform each word embedding as follows:

$$e(w) \leftarrow bm25(w)*e(w)$$

For each multi-word term $z = w_1 \ldots w_n$, the application and embedding space mapper 116 may generate term embedding by summing embeddings of constituent words as follows:

$$e(z) \leftarrow \frac{1}{n}\sum_{i=1}^{i=n} e(w_i)$$

With respect to mapping of social media analytics applications to embedding space, the application and embedding space mapper 116 may generate application embeddings. For example, for each social media analytics application $sma_{app}$ in the application database smaDB, the application and embedding space mapper 116 may populate a list of entity terms in its description as $en[sma_{app}]$, a list of action terms as $act[sma_{app}]$, and remaining words as $r[sma_{app}]$. The application and embedding space mapper 116 may map $sma_{app}$ onto the embedding space as follows:

$$e(sma_{app}) = \{e(en[sma_{app}]).e(act[sma_{app}]), e(r[sma_{app}])\}, \text{ where}$$

$$e(en[sma_{app}]) = \frac{\sum_{z \in en[sma_{app}]} e(z)}{|en[sma_{app}]|}$$

$$e(act[sma_{app}]) = \frac{\sum_{z \in act[sma_{app}]} e(z)}{|act[sma_{app}]|}$$

$$e(r[sma_{app}]) = \frac{\sum_{z \in r[sma_{app}]} e(w)}{|r[sma_{app}]|}$$

|·| returns number of elements in the set or list

With respect to generation of a semantic cohesion network, at block 210 of FIG. 2, the semantic cohesion network generator 120 may generate a semantic cohesion network by specifying $G_{smaDB}=(V_{smaDB}, E_{smaDB}, bonding)$ to be the semantic cohesion network among all social media analytics applications in the smaDB. Thus, the semantic cohesion network generator 120 may generate $G_{smaDB}$ by specifying $V_{smaDB}$ as the set of nodes corresponding to the social media analytics applications in smaDB such that node $v_i$ corresponds to $sma_{app}{}^i$. The semantic cohesion network generator 120 may specify $E_{smaDB} \subseteq V_{smaDB} \times V_{smaDB}$ as the set of undirected links between pair of nodes having semantic cohesion $\vartheta$, where $\vartheta$ is a thresholding parameter (default=0.85). Further, the semantic cohesion network generator 120 may specify bonding: $E_{smaDB} \mapsto [\vartheta, 1]$ as a function which associates weights with edges such that, for all $e=(v_1, v_2) \in E_{smaDB}$:

$$bonding(v_1, v_2) = semCh(sma_{app}{}^1, sma_{app}{}^2)$$

With respect to determination of semantic cohesion among applications, at block 212 of FIG. 2, the semantic cohesion estimator 124 may measure pair-wise semantic cohesion. In this regard, the semantic cohesion estimator 124 may specify $sma_{app}{}^1$ and $sma_{app}{}^2$ to be two applications in the social media analytics application database smaDB with their mappings into embedding space as:

$$e(sma_{app}{}^1) = \{e(en[sma_{app}{}^1]), e(act[sma_{app}{}^1]), e(r[sma_{app}{}^2])\}$$

and $$e(sma_{app}{}^2) = \{e(en[sma_{app}{}^2]), e(act[sma_{app}{}^2]), e(r[sma_{app}{}^2])\}$$

The semantic cohesion estimator 124 may determine semantic cohesion between $sma_{app}{}^1$ and $sma_{app}{}^2$ as follows:

$$semCh(sma_{app}{}^1, sma_{app}{}^2) = \alpha_{pl} * \text{mean}\{\alpha_{en}, \alpha_{act}, \alpha_r\} \text{ where}$$

$$\alpha_{en} = \text{cosine}(en[sma_{app}{}^1], en[sma_{app}{}^2])$$

$$\alpha_{act} = \text{cosine}(act[sma_{app}{}^1], act[sma_{app}{}^2])$$

$$\alpha_r = \text{cosine}(r[sma_{app}{}^1], r[sma_{app}{}^2])$$

$$\alpha_{pl} = \begin{cases} 1.0 & \text{if SMA platforms for both application are same} \\ 0.5 & \text{otherwise} \end{cases}$$

With respect to identification of semantically cohesive application groups, at block 214 of FIG. 2, the semantically cohesive group identifier 128 may identify semantically cohesive groups by specifying $\Phi = 2^{V_{smaDB}} = \{V \subseteq V_{smaDB}\}$ to be the set of all the subsets of $V_{smaDB}$, and removing from P all those subsets of nodes, where at least one pair of nodes is not connected to each other as follows:

$$\Phi' = \Phi \setminus \{V \subseteq V_{smaDB} | \exists v, v' \in V \text{ s.t. } (v, v') \notin E_{smaDB}\}$$

Further, the semantically cohesive group identifier 128 may remove from $\Phi'$ all those subsets of nodes which are included in any other subset in $\Phi'$ as follows:

$$\Phi'' = \Phi' \setminus \{V \in \Phi' | \exists V' \in \Phi' \text{ s.t. } V \subset V'\}$$

In this regard, V' may represent another subset of nodes such that it contains all the nodes in the set V (e.g., nodes in V are also included in V'). In this regard, the semantically cohesive group identifier 128 may identify all the maximal groups of social media analytics applications so that all the applications within each group are semantically cohesively connected to each other. Further, these groups may include maximum possible applications in that if any other application is added to a group, it may not be semantically cohesive to at least one of the existing application in the group. In this regard, $\Phi''$ may represent the list of these maximal groups of social media analytics applications.

Next, with respect to synthesizing a design template for a new social media analytics application, at block 216 of FIG. 2, the affinity group identifier 136 may identify affinity groups for a new social media analytics application $(\text{new}_{smaAPP})$ by specifying $e(\text{new}_{smaAPP})$ to be the embedding of the new application generated as per blocks 204-212. The affinity group identifier 136 may estimate mean semantic cohesiveness of new smaAPP with all the groups of applications in $\Phi''$. For each group $Q \in \Phi''$, the affinity group identifier 136 may specify $\Gamma(Q)$ to be the mean semantic cohesiveness of application in Q with $\text{new}_{smaAPP}$ as follows:

$$\Gamma(Q) = \text{mean}\{semCh(\text{new}_{smaAPP}, X) | X \in Q\}$$

In this regard, X may represent a variable that ranges over the group Q (e.g., X one by one takes values as different elements of group Q so that for that element semCh(new$_{smaAPP}$, X) may be estimated). The affinity group identifier 136 may sort application groups as per descending order of Γ(·). In this regard, the affinity group identifier 136 may specify $Q_{max} \in \Phi''$ to be the group having maximum Γ(·) as follows:

$$\Gamma(Q_{max}) = \max\{\Gamma(Q) | Q \in \Phi''\}$$

With respect to generation of a design template for the new social media analytics application, at block 218 of FIG. 2, the design template generator 140 may generate a design template for the new social media analytics application to include the components of feature set, ensemble of machine learning methods, performance metrics, and machine learning pipeline architecture. The feature set may represent the group of features to be extracted from the data to build the machine learning model. The ensemble of machine learning methods may represent the set of machine learning methods that work together as per the machine learning pipeline. The performance metric may represent the set of parameters used to assess performance of the machine learning model underlying the application. The machine learning pipeline architecture may represent the sequence of steps to be executed on a platform, such as an AutoML platform, using the feature set as specification to extract feature values from data, train machine learning methods, and estimate performance parameters.

With respect to synthesizing a feature set for the new social media analytics application, at block 220 of FIG. 2, the feature set synthesizer 144 may specify $Q_{max} = \{v_1, \ldots, v_k\}$ to be the nodes in the highest affinity group with corresponding applications be $$\{smaApp_1, \ldots, smaApp_k\}$$

The feature set synthesizer 144 may specify feature sets for these group of applications to be $$Fset_1: \{f_{1,1}, \ldots, f_{1,n_1}\}$$

$$Fset_k: \{f_{k,1}, \ldots, f_{k,n_k}\}$$

The features sets may be specified such that feature set of 1$^{st}$ application in $Q_{max}$ has $n_1$ features, 2$^{nd}$ application has $n_2$ features, . . . etc.

With respect to feature relevance for the new social media analytics application, the feature set synthesizer 144 may populate a feature relevance matrix by specifying $$Fset = \bigcup_{i=1}^{k} Fset_i = \{F_1, \ldots, F_m\}$$

In this regard, Fset may represent the set of all unique features across all feature sets in $Q_{max}$. For each feature $F_i \in$ Fset, the feature set synthesizer 144 may specify $\beta_{i,j}$ to be its performance association score (PAS) for smaApp$_j$ as follows:

$$\beta_{i,j} = \begin{cases} \delta_{j,i} & \text{if } F_i \in Fset_j \\ 0 & \text{otherwise} \end{cases}$$

In this regard, $\|\beta_{i,j}\|_{m \times k}$ may represent the feature relevance matrix. The feature set synthesizer 144 may determine (e.g., estimate) a probable performance association score to filter features. The feature set synthesizer 144 may determine a likely performance association score of each feature $F_i$ for the new application new$_{smaApp}$ based on its performance association score for existing applications in $Q_{max}$, and their semantic cohesions with new$_{smaApp}$ as follows:

$$PAS(F_i) = \frac{1}{k} \sum_{j=1}^{k} semCh(newApp, smaApp_j) * \beta_{i,j}$$

The feature set synthesizer 144 may remove all of the features from Fset having a PAS less that a threshold parameter $\pi \in [0,1]$, where 0 indicates that all the features are to be considered, and 1 indicates that only those features which are likely to contribute to the performance are to be considered as follows:

$$Fset \leftarrow Fset \setminus \{F_a \in Fset | PAS(F_a) < \pi\}$$

The feature set synthesizer 144 may sort features in Fset based upon their PAS estimates. The final set of features in Fset may represent the 1$^{st}$ component of the design template for the new application new$_{smaAPP}$.

With respect to the machine learning method ensemble for the new social media analytics application, the feature set synthesizer 144 may collect machine learning methods from ensembles of affinity groups. In this regard, with each social media analytics application in smaDB, a set of machine learning methods may be associated to address the learning challenge underlying the application. A set of machine learning methods together may work as an ensemble. When there is one machine learning method, it may be considered as a singleton ensemble. The feature set synthesizer 144 may specify the ensembles of machine learning methods associated with the social media analytics applications in the affinity group of new$_{smaApp}$ corresponding to $Q_{max}$ be:

$$MLset_1: \{ML_{1,1}, \ldots, ML_{1,t_1}\}$$

$$MLset_k: \{ML_{k,1}, \ldots, ML_{k,t_k}\}$$

Thus, the ensemble of machine learning methods for the 1$^{st}$ application in $Q_{max}$ may have $t_1$ methods, the 2$^{nd}$ application may have $t_2$ methods, . . . etc.

Figure 4:
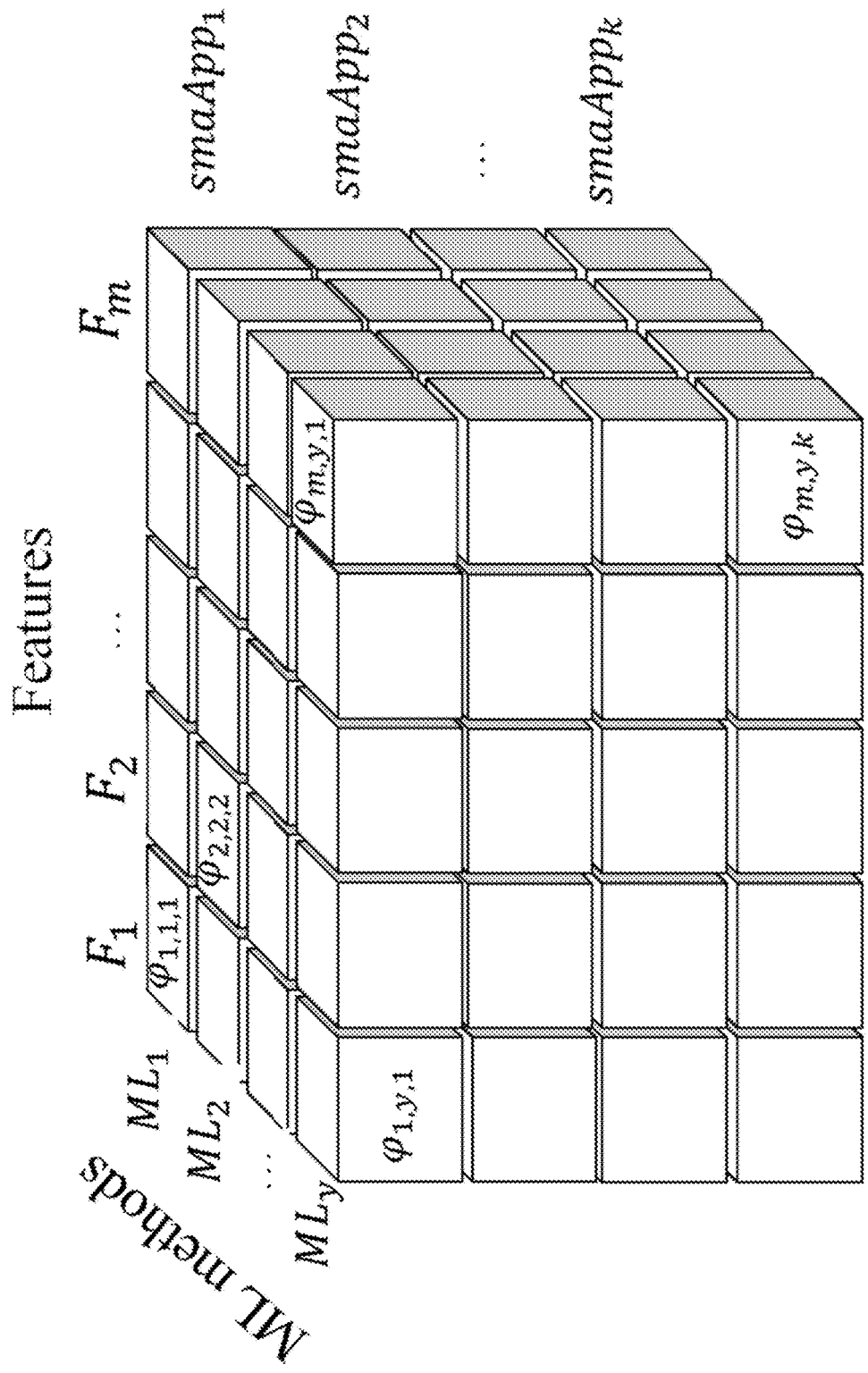
FIG. 4 illustrates a graphical view of a feature-method-application association matrix to illustrate operation of the data-driven social media analytics application synthesis apparatus of FIG. 1 in accordance with an example of the present disclosure.

FIG. 4 illustrates a graphical view of a feature-method-application association matrix to illustrate operation of the apparatus 100 in accordance with an example of the present disclosure.

With respect to feature-methods associations for the new social media analytics application, at block 222 of FIG. 2 and with further reference to FIG. 4, the association matrix generator 146 may generate a feature-method-application association matrix by specifying $$MLset = \bigcup_{i=1}^{k} MLset_i = \{ML_1, \ldots, ML_y\}$$

MLset may represent the set of all unique machine learning methods across all ensembles for $Q_{max}$. Each machine learning method in the ensemble for a social media analytics application may be associated with all the features for the application. Further, across all applications in the affinity group $Q_{max}$, each method may be associated with multiple features as it may appear in the multiple ensembles, which may provide the basis for the three-dimensional feature-method-application association matrix. For the three-dimensional feature-method-application association matrix, the $1^{st}$ dimension may be specified such that each row of the matrix represents a feature appearing in the final feature set Fset. The $2^{nd}$ dimension may be specified such that each column of the matrix is for a machine learning method in MLset. Further, the $3^{rd}$ dimension may be specified such that each aisle of the matrix is for an application in $Q_{max}$. With respect to contents of the three-dimensional feature-method-application association matrix, each cell $⟦φ_{a,b,c}⟧_{m×y×k}$ may be specified as:

$$\varphi_{a,b,c} = \begin{cases} \beta_{a,c} & \text{if } ML_b \in MLset_c \\ 0 & \text{otherwise} \end{cases}$$

In this regard, $φ_{a,b,c}$ may represent the performance association scores (PAS) of feature $F_a \in$ Fset for application $smaApp_c \in Q_{max}$ if machine learning method $ML_b \in$ MLset is also in the ensemble set $MLset_c$ of application $smaApp_c$.

With respect to the ensemble for the new social media analytics application, at block 224 of FIG. 2, the machine learning method ensemble synthesizer 150 may identify a machine learning method ensemble for $new_{smaApp}$. In this regard, for each machine learning method $ML_b \in$ MLset, the machine learning method ensemble synthesizer 150 may determine (e.g., estimate) design significance for $new_{smaApp}$ as follows:

$$dsig(ML_b) = \sum_{a=1}^{a=m} \sum_{c=1}^{c=k} \varphi_{a,b,c}$$

The machine learning method ensemble synthesizer 150 may remove all those machine learning methods from MLset having dsig(·) less that a threshold parameter $\epsilon \in [0, 1]$:

ϵ=0 indicates that all the ML methods should be considered and

ϵ=1 indicates that only those ML methods which are going to be completely design compatible with $new_{smaApp}$ should be considered:

MLset←MLset\\{$ML_u \in$ MLset|dsig($ML_u$)<ϵ}

The machine learning method ensemble synthesizer 150 may sort the remaining machine learning methods in MLset based upon their dsig( ) estimates. The final set of machine learning methods in MLset may represent the $2^{nd}$ component of the design template for the new application $new_{smaAPP}$.

With respect to the performance metric for the new social media analytics application, at block 226 of FIG. 2, the performance metric identifier 152 may identify the performance metric for $new_{smaApp}$. In this regard, for each application in the affinity group $smaApp_j \in Q_{max}$, the performance metric identifier 152 may determine (e.g., estimate) how many of the features in its feature list $Fset_j$ and machine learning methods in its ensemble $MLset_j$ are in the recommended list of Fset (e.g., with respect to $1^{st}$ dimension discussed above) and MLset (e.g., with respect to $2^{nd}$ dimension discussed above) for $new_{smaApp}$ as:

overlap($smaApp_j$)=$\Sigma_{F_i \in (Fset \cap Fset_j)} φ_{i,j}$+|MLset∩MLset$_j$|

The performance metric identifier 152 may sort applications as per overlap(·) in descending order. The performance metric identifier 152 may specify $smaApp_z$ to be the application at the top of the list. Further, the performance metric identifier 152 may specify $p_z$ to be the performance metric (single or multiple) for $smaApp_z$. In this regard, $p_z$ may represent the $3^{rd}$ component of the design template for $new_{smaApp}$.

With respect to the design architecture for the new social media analytics application, at block 228 of FIG. 2, the machine learning pipeline identifier 154 may determine a machine learning pipeline for the $new_{smaApp}$. In this regard, the machine learning pipeline identifier 154 may specify Pipeline$_{ML}$⟦$smaApp_z$⟧ to be the execution pipeline for the $smaApp_z$ which has been used by the AutoML platform to build $smaApp_z$. The Pipeline$_{ML}$⟦$smaApp_z$⟧ may represent the $4^{th}$ component of the design template for the $new_{smaApp}$.

Figure 5:
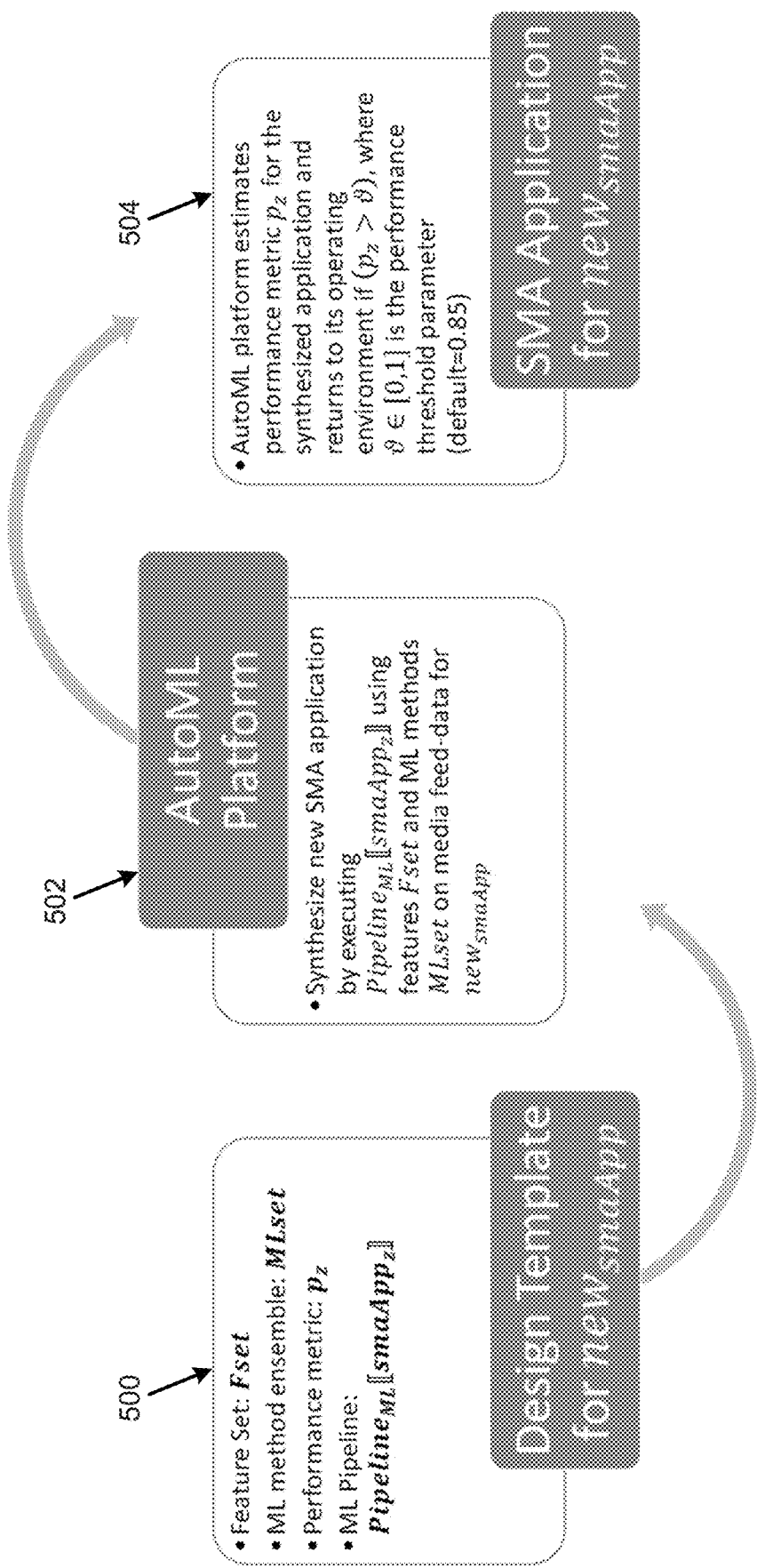
FIG. 5 illustrates synthesis of a social media analytics application to illustrate operation of the data-driven social media analytics application synthesis apparatus of FIG. 1 in accordance with an example of the present disclosure.

FIG. 5 illustrates synthesis of a social media analytics application to illustrate operation of the apparatus 100 in accordance with an example of the present disclosure.

Referring to FIGS. 2 and 5, with respect to synthesis of the new social media analytics application, at block 230 of FIG. 2, the new application synthesizer 132 may synthesize the $new_{smaApp}$ from the design template. For example, as shown at 500, the design template for the $new_{smaApp}$ may include the feature set Fset, machine learning method ensemble MLset, performance metric $p_z$, and machine learning pipeline Pipeline$_{ML}$⟦$smaApp_z$⟧. With respect to the AutoML platform at 502, the new social media analytics application may be synthesized by executing Pipeline$_{ML}$⟦$smaApp_z$⟧ using features Fset, and machine learning methods MLset on media feed-data for $new_{smaApp}$. With respect to the social media analytics application for $new_{smaApp}$, the AutoML platform may determine performance metric $p_z$ for the synthesized application, and return to its operating environment if ($p_z$>ϑ), where ϑ∈[0,1] is the performance threshold parameter (default=0.85).

Figure 6:
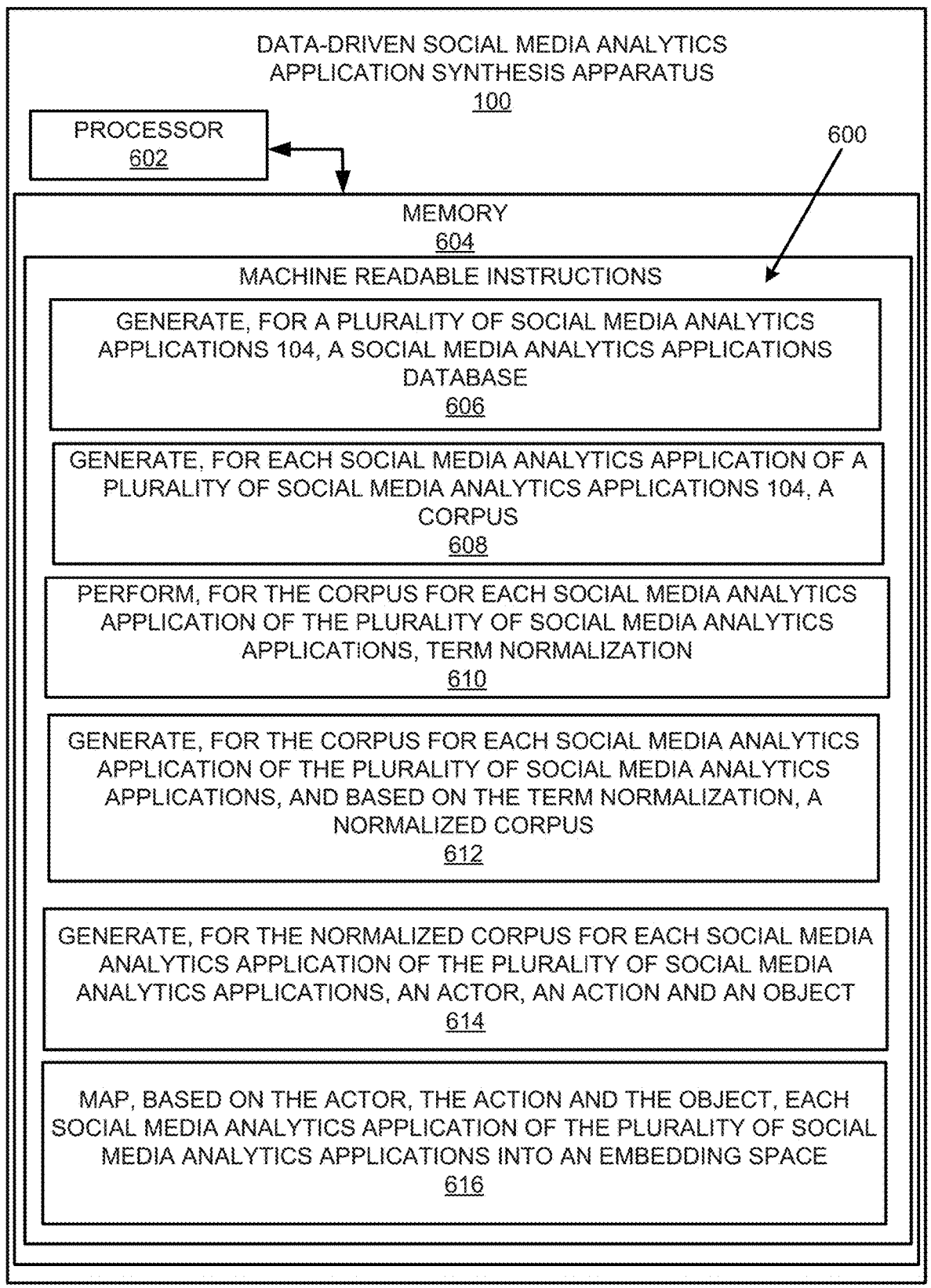
FIG. 6 illustrates an example block diagram for data-driven social media analytics application synthesis in accordance with an example of the present disclosure.
Figure 6:
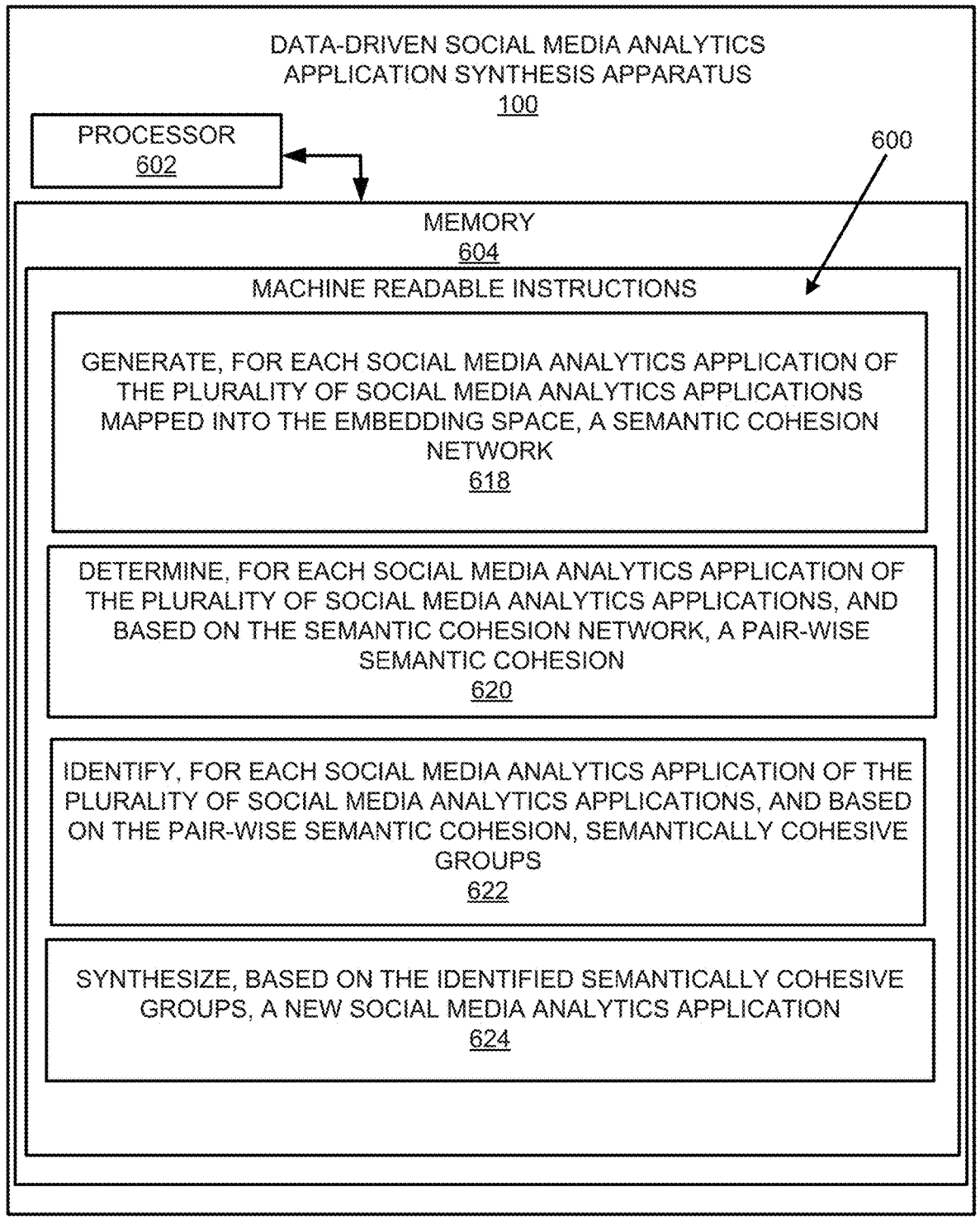
Figure 8:
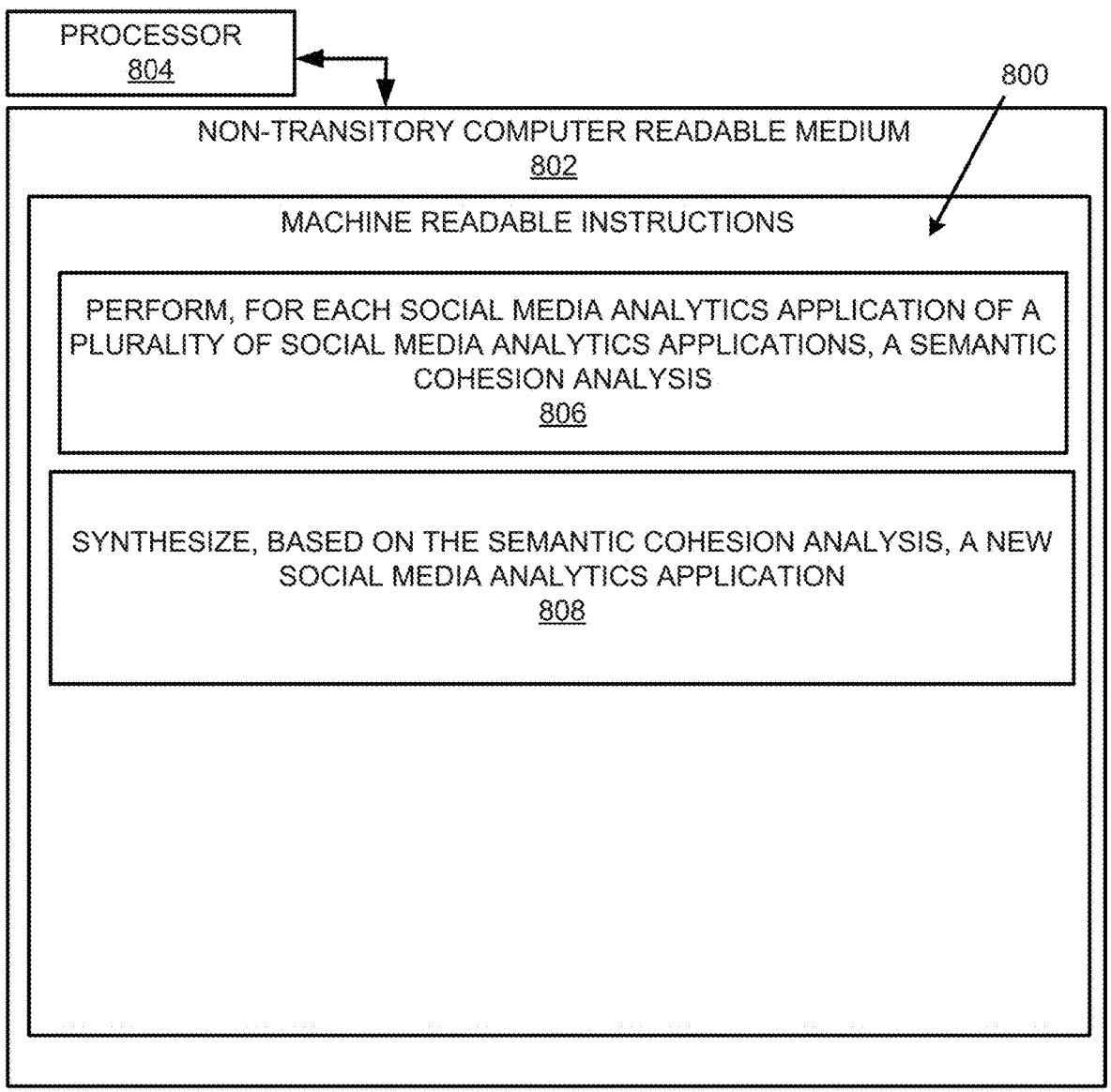
FIG. 8 illustrates a further example block diagram for data-driven social media analytics application synthesis in accordance with another example of the present disclosure.

FIGS. 6-8 respectively illustrate an example block diagram 600, a flowchart of an example method 700, and a further example block diagram 800 for data-driven social media analytics application synthesis, according to examples. The block diagram 600, the method 700, and the block diagram 800 may be implemented on the apparatus 100 described above with reference to FIG. 1 by way of example and not of limitation. The block diagram 600, the method 700, and the block diagram 800 may be practiced in other apparatus. In addition to showing the block diagram 600, FIG. 6 shows hardware of the apparatus 100 that may execute the instructions of the block diagram 600. The hardware may include a processor 602, and a memory 604 storing machine readable instructions that when executed by the processor cause the processor to perform the instructions of the block diagram 600. The memory 604 may represent a non-transitory computer readable medium. FIG. 7 may represent an example method for data-driven social media analytics application synthesis, and the steps of the method. FIG. 8 may represent a non-transitory computer readable medium 802 having stored thereon machine readable instructions to provide data-driven social media analytics application synthesis according to an example. The machine readable instructions, when executed, cause a processor 804 to perform the instructions of the block diagram 800 also shown in FIG. 8.

The processor 602 of FIG. 6 and/or the processor 804 of FIG. 8 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 802 of FIG. 8), such as hardware storage devices (e.g., RAM (random access memory), ROM (read only memory), EPROM (erasable, programmable ROM), EEPROM (electrically erasable, programmable ROM), hard drives, and flash memory). The memory 604 may include a RAM, where the machine readable instructions and data for a processor may reside during runtime.

Referring to FIGS. 1-6, and particularly to the block diagram 600 shown in FIG. 6, the memory 604 may include instructions 606 to generate, for a plurality of social media analytics applications 104, a social media analytics applications database 106.

The processor 602 may fetch, decode, and execute the instructions 608 to generate, for each social media analytics application of a plurality of social media analytics applications 104, a corpus 110.

The processor 602 may fetch, decode, and execute the instructions 610 to perform, for the corpus 110 for each social media analytics application of the plurality of social media analytics applications 104, term normalization.

The processor 602 may fetch, decode, and execute the instructions 612 to generate, for the corpus 110 for each social media analytics application of the plurality of social media analytics applications 104, and based on the term normalization, a normalized corpus.

The processor 602 may fetch, decode, and execute the instructions 614 to generate, for the normalized corpus for each social media analytics application of the plurality of social media analytics applications 104, an actor, an action and an object 114.

The processor 602 may fetch, decode, and execute the instructions 616 to map, based on the actor, the action and the object 114, each social media analytics application of the plurality of social media analytics applications 104 into an embedding space 118.

The processor 602 may fetch, decode, and execute the instructions 618 to generate, for each social media analytics application of the plurality of social media analytics applications 104 mapped into the embedding space 118, a semantic cohesion network 122.

The processor 602 may fetch, decode, and execute the instructions 620 to determine, for each social media analytics application of the plurality of social media analytics applications 104, and based on the semantic cohesion network 122, a pair-wise semantic cohesion 126.

The processor 602 may fetch, decode, and execute the instructions 622 to identify, for each social media analytics application of the plurality of social media analytics applications 104, and based on the pair-wise semantic cohesion 126, semantically cohesive groups 130.

The processor 602 may fetch, decode, and execute the instructions 624 to synthesize, based on the identified semantically cohesive groups 130, a new social media analytics application 134.

Referring to FIGS. 1-5 and 7, and particularly FIG. 7, for the method 700, at block 702, the method may include identifying, for each social media analytics application of a plurality of social media analytics applications 104, and based on a pair-wise semantic cohesion, semantically cohesive groups 130.

At block 704, the method may include synthesizing, based on the identified semantically cohesive groups 130, a new social media analytics application 134.

Referring to FIGS. 1-5 and 8, and particularly FIG. 8, for the block diagram 800, the non-transitory computer readable medium 802 may include instructions 806 to perform, for each social media analytics application of a plurality of social media analytics applications 104, a semantic cohesion analysis.

The processor 804 may fetch, decode, and execute the instructions 808 to synthesize, based on the semantic cohesion analysis, a new social media analytics application 134.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A data-driven social media analytics application synthesis apparatus comprising:
   a corpus builder and term normalizer, executed by at least one hardware processor, to
      generate, for each social media analytics application of a plurality of social media analytics applications, a corpus including text data extracted from each social media analytics application of the plurality of social media analytics applications, wherein each of the plurality of social media analytics applications includes a feature set including the text data, at least one machine learning method, performance metrics, and a machine learning pipeline architecture,
      perform, for the corpus for each social media analytics application of the plurality of social media analytics applications, term normalization on the text data, by replacing equivalent terms in the text data with one representative term, and
      generate, for the corpus for each social media analytics application of the plurality of social media analytics applications, and based on the term normalization, a normalized corpus including normalized text data;
   an actor, action, and object extractor, executed by the at least one hardware processor, to extract, from the normalized text data in the normalized corpus of each social media analytics application of the plurality of social media analytics applications, an actor, an action and an object, wherein the actor performs the action related to the object;
   an application and embedding space mapper, executed by the at least one hardware processor, to map, based on the actor, the action and the object, each social media analytics application of the plurality of social media analytics applications into an embedding space;
   a semantic cohesion network generator, executed by the at least one hardware processor, to generate, for each social media analytics application of the plurality of social media analytics applications mapped into the embedding space, a semantic cohesion network;
   a semantic cohesion estimator, executed by the at least one hardware processor, to determine, based on the semantic cohesion network, a pair-wise semantic cohesion for every two social media analytics applications of the plurality of social media analytics applications;
   a semantically cohesive group identifier, executed by the at least one hardware processor, to identify, based on the pair-wise semantic cohesion, semantically cohesive groups; and
   a new application synthesizer, executed by the at least one hardware processor, to synthesize, based on the identified semantically cohesive groups, a new social media analytics application including a new feature set, at least one new machine learning method, new performance metrics, and a new machine learning pipeline architecture.

2. The data-driven social media analytics application synthesis apparatus according to claim 1, wherein each social media analytics application of the plurality of social media analytics applications further includes a problem description, and an application identification.

3. The data-driven social media analytics application synthesis apparatus according to claim 1, further comprising:
an affinity group identifier, executed by the at least one hardware processor, to identify, for the new social media analytics application, a plurality of affinity groups from the semantically cohesive groups.

4. The data-driven social media analytics application synthesis apparatus according to claim 3, further comprising:
a design template generator, executed by the at least one hardware processor, to generate, based on the plurality of affinity groups identified from the semantically cohesive groups, a design template for the new social media analytics application to include the new feature set, the at least one new machine learning method, the new performance metrics, and the new machine learning pipeline architecture.

5. The data-driven social media analytics application synthesis apparatus according to claim 4, further comprising:
a feature set synthesizer, executed by the at least one hardware processor, to synthesize, for the new social media analytics application, the new feature set to include a specified number of new features.

6. The data-driven social media analytics application synthesis apparatus according to claim 5, further comprising:
an association matrix generator, executed by the at least one hardware processor, to generate, for the new social media analytics application, a feature-method-application association matrix that includes features from the feature set and the at least one machine learning method of each of the plurality of social media analytics applications.

7. The data-driven social media analytics application synthesis apparatus according to claim 6, further comprising:
a machine learning method ensemble synthesizer, executed by the at least one hardware processor, to identify, for the new social media analytics application and based on the feature-method-application association matrix, the at least one new machine learning method.

8. The data-driven social media analytics application synthesis apparatus according to claim 7, further comprising:
a performance metric identifier, executed by the at least one hardware processor, to identify, for the new social media analytics application and based on the feature-method-application association matrix, the new performance metrics.

9. The data-driven social media analytics application synthesis apparatus according to claim 8, further comprising:
a machine learning pipeline identifier, executed by the at least one hardware processor, to determine, for the new social media analytics application and based on the feature-method-application association matrix, the new machine learning pipeline architecture.

10. The data-driven social media analytics application synthesis apparatus according to claim 9, wherein the new application synthesizer is executed by the at least one hardware processor to
synthesize, based on the semantically cohesive groups, the new feature set for the new social media analytics application, the at least one new machine learning method for the new social media analytics application, the new performance metrics for the new social media analytics application, and the new machine learning pipeline architecture for the new social media analytics application.

11. A method for data-driven social media analytics application synthesis, the method comprising:
building, by at least one hardware processor, a database of a plurality of social media analytics applications, including extracting text data from the plurality of social media analytics applications, normalizing the text data by replacing equivalent terms of the text data with one representative term, and mapping terms of the text data to embedding spaces, wherein each of the plurality of social media analytics applications includes the text data of a social media platform, at least one machine learning method, performance metrics, and a machine learning pipeline architecture;
building, by the at least one hardware processor, a semantic cohesion network among the plurality of social media analytics applications in the database, including identifying a pair-wise semantic cohesion for every two social media analytics applications based on the mappings of the terms to the embedding spaces;
identifying, by the at least one hardware processor, based on the pair-wise semantic cohesion, semantically cohesive groups for the plurality of social media analytics applications; and
synthesizing, by the at least one hardware processor, based on the semantically cohesive groups, a new social media analytics application including a new feature set, at least one new machine learning method, new performance metrics, and a new machine learning pipeline architecture.

12. The method for data-driven social media analytics application synthesis according to claim 11, the method comprising:
identifying, by the at least one hardware processor, for the new social media analytics application, a plurality of affinity groups from the semantically cohesive groups.

13. The method for data-driven social media analytics application synthesis according to claim 12, the method comprising:
generating, by the at least one hardware processor, based on the plurality of affinity groups identified from the semantically cohesive groups, a design template for the new social media analytics application to include the new feature set, the at least one new machine learning method, the new performance metrics, and the new machine learning pipeline architecture.

14. The method for data-driven social media analytics application synthesis according to claim 13, the method comprising:
synthesizing, by the at least one hardware processor, for the new social media analytics application, the new feature set to include a specified number of features.

15. The method for data-driven social media analytics application synthesis according to claim 14, the method comprising:
generating, by the at least one hardware processor, for the new social media analytics application, a feature-method-application association matrix that includes features from the feature set and the at least one machine learning method of each of the plurality of social media analytics applications.

16. The method for data-driven social media analytics application synthesis according to claim 15, the method comprising:
identifying, by the at least one hardware processor, based on the feature-method-application association matrix, the at least one new machine learning method for the new social media analytics application.

17. The method for data-driven social media analytics application synthesis according to claim 16, the method comprising:
identify, by the at least one hardware processor, based on the feature-method-application association matrix, the new performance metrics for the new social media analytics application.

18. The method for data-driven social media analytics application synthesis according to claim 17, the method comprising:
determining, by the at least one hardware processor, based on the feature-method-application association matrix, the new machine learning pipeline architecture for the new social media analytics application.

19. The method for data-driven social media analytics application synthesis according to claim 18, further comprising:
identifying, based on the feature-method-application association matrix, the new performance metrics for the new social media analytics application.

20. A non-transitory computer readable medium having stored thereon machine readable instructions, the machine readable instructions, when executed by at least one hardware processor, cause the at least one hardware processor to:
build a database of a plurality of social media analytics applications, including extracting text data from the plurality of social media analytics applications and mapping terms in the extracted text data to embedding spaces for the plurality of social media analytics applications, wherein each of the plurality of social media analytics applications includes the text data of a social media platform, at least one machine learning method, performance metrics, and a machine learning pipeline architecture;
build a semantic cohesion network among the plurality of social media analytics applications in the database, including identifying a pair-wise semantic cohesion for every two social media analytics applications based on the mappings of the terms to the embedding spaces;
identify, based on the pair-wise semantic cohesion, semantically cohesive groups for the plurality of social media analytics applications; and
synthesize, based on the semantically cohesive groups, a new social media analytics application including a new feature set, at least one new machine learning method, new performance metrics, and a new machine learning pipeline architecture.

* * * * *